UNITED STATES PATENT OFFICE.

ROBERTO LEPETIT AND ERNESTO TAGLIANI, OF SUSA, ITALY.

PROCESS OF MAKING EXTRACT DYES.

SPECIFICATION forming part of Letters Patent No. 704,843, dated July 15, 1902.

Application filed July 18, 1896. Serial No. 599,718. (No specimens.)

*To all whom it may concern:*

Be it known that we, ROBERTO LEPETIT, chemical manufacturer, and ERNESTO TAGLIANI, technical chemist, residing in Susa, Italy, have invented a new and useful Process of Making Extract Dyes, of which the following is a specification.

Our invention relates to an improvement in dyeing or coloring extracts such as are obtained from natural sources—as, for example, from old fustic, (*Morus tinctoria*,) new fustic, (*Rhus cotinus*,) or quercitron (*Quercus tinctoria*.) Extracts as ordinarily obtained from these sources give in practice faint shades and possess an undesirable degree of solubility. Our invention has the effect of converting such extracts into almost insoluble dyes and producing in use shades of much greater brilliancy and permanence than can be obtained with the extracts as ordinarily employed.

Our process consists in the treatment of color or dye extracts of the character above mentioned with a salt of sulfurous acid. The salt of sulfurous acid which we usually employ is the sodium salt—viz., sodium sulfite or sodium bisulfite; but the sulfurous-acid salts of any of the alkali metals may be employed—as, for instance, potassium or ammonium sulfite or bisulfite.

In carrying out our process we subject the color or dye extract to the action of the sulfurous-acid salt under the influence of heat and pressure obtained by performing the reaction in a closed vessel. The degrees of heat and pressure are not fixed, but may be varied within certain limits, according to circumstances and the particular salt or extract employed.

We give the following examples as illustrative of our process and to enable others to carry out our invention.

*Example I—The manufacture of a new yellow-dye material from old fustic extract,* (*Morus tinctoria*.)—Three hundred kilograms of old fustic extract of a strength of 28° Baumé and one hundred kilograms of sodium bisulfite of 35° Baumé are heated in a closed vessel for a period of eight hours at a temperature of from 110° to 115° centigrade. There results from this reaction a uniform mass of somewhat-thick consistency of microscopical crystals. This new product possesses a great degree of insolubility, being only very slightly soluble in hot water. The dyestuff so obtained produces colors of much greater brilliancy and clearer color than the old fustic extract as ordinarily employed.

*Example II—The production of a yellow dye from the young fustic,* (*Rhus cotinus*.)— Three hundred kilograms of young fustic extract of 25° Baumé and 100 kilograms of sodium of bisulfite of 35° Baumé are heated in a closed vessel at a temperature of from 140° to 150° centigrade during a period of eight hours. There is obtained from this reaction a uniform mass of thick consistency of microscopical crystals. This substance is only very slightly soluble in hot water.

*Example III—The production of a soluble quercitron-bark extract.*—Three hundred kilograms of quercitron extract of 28° Baumé and one hundred kilograms of sodium bisulfite of 35° Baumé are heated in a closed vessel at a temperature of about 140° to 145° centigrade for a period of eight hours. The product of this reaction is of the same improved quality as a dyestuff as is the case in the preceding examples.

Having described our invention, what we claim as new, and desire to secure by Letters Patent, is—

1. The process of obtaining an improved dye from a natural dyewood extract, which consists in treating the extract with a salt of sulfurous acid, under the influence of heat and pressure.

2. The process of obtaining an improved dye from a natural dyewood extract, which consists in treating the extract with a sulfurous-acid salt of an alkali metal, under the influence of heat and pressure.

3. The process of obtaining a new dye from natural-color extracts, which consists in treating the natural extract with sodium bisulfite at a temperature of from 110° to 150° centigrade under pressure.

In witness whereof we have hereunto set our hands in presence of two witnesses.

ROBERTO LEPETIT.
ERNESTO TAGLIANI.

Witnesses:
HUGO FIZZANI,
RAFFALE ROFNE.